(12) United States Patent
Brüssel

(10) Patent No.: US 7,891,967 B2
(45) Date of Patent: Feb. 22, 2011

(54) APPARATUS HAVING A LIFTING APPARATUS

(75) Inventor: Richard Brüssel, Sulzfeld (DE)

(73) Assignee: Schmidt & Heinzmann GmbH & Co. KG, Bruchsal (DE)

( * ) Notice: Subject to any disclaimer, the term of this patent is extended or adjusted under 35 U.S.C. 154(b) by 739 days.

(21) Appl. No.: 11/892,207

(22) Filed: Aug. 21, 2007

(65) Prior Publication Data

US 2008/0152470 A1    Jun. 26, 2008

(30) Foreign Application Priority Data

Dec. 20, 2006    (DE) .................... 10 2006 060240

(51) Int. Cl.
B29C 31/08    (2006.01)

(52) U.S. Cl. .................. 425/446; 198/456; 198/468.01; 198/468.6; 198/470.1; 198/474.1; 198/494; 198/496; 198/498

(58) Field of Classification Search .......... 198/456, 198/468.01, 468.6, 470.1, 474.1, 494, 496, 198/498; 294/119.1; 425/446; B29C 31/08
See application file for complete search history.

(56) References Cited

U.S. PATENT DOCUMENTS

| | | | | |
|---|---|---|---|---|
| 2,662,792 A | * | 12/1953 | Ruth | 294/103.1 |
| 4,616,971 A | * | 10/1986 | Matrone | 414/730 |
| 4,926,789 A | * | 5/1990 | Wenger et al. | 118/668 |
| 5,368,678 A | * | 11/1994 | Miyamoto et al. | 156/405.1 |
| 5,425,834 A | * | 6/1995 | Shinohara et al. | 156/360 |
| 6,074,163 A | * | 6/2000 | Yamazaki et al. | 414/795.5 |
| 7,234,913 B2 | * | 6/2007 | Heiland et al. | 414/806 |
| 2005/0042319 A1 | * | 2/2005 | Brussel | 425/110 |

FOREIGN PATENT DOCUMENTS

| | | |
|---|---|---|
| DE | 39 15380 A1 | 11/1990 |
| DE | 40 29 910 A1 | 3/1992 |
| DE | 43 37 580 A1 | 5/1995 |
| DE | 198 01 731 A1 | 7/1999 |
| DE | 202 03 818 U1 | 5/2002 |
| DE | 102 33 299 A1 | 2/2004 |
| DE | 10 2004 006 085 A1 | 9/2005 |
| EP | 0 450 482 | 10/1991 |
| EP | 0 461 365 | 12/1991 |
| EP | 0 588 261 | 3/1994 |
| EP | 1 386 709 | 2/2004 |
| WO | WO 03/072414 | 9/2003 |

OTHER PUBLICATIONS

European Search Report dated Feb. 19, 2008 in corresponding European patent application No. 07009879.3-1253.
German Search Report dated Sep. 17, 2007 in corresponding German patent Application No. 10 2006 060 240.4.

* cited by examiner

Primary Examiner—Robert B Davis
(74) Attorney, Agent, or Firm—Posz Law Group, PLC

(57) ABSTRACT

A lifting apparatus includes at least one carrying means that is mounted on a compensation bearing unit and that is for receiving and/or delivering a polymer melt, and in particular a tacky polymer melt.

39 Claims, 4 Drawing Sheets

APPARATUS HAVING A LIFTING APPARATUS

CROSS REFERENCE TO RELATED APPLICATION

The present application is based on, claims priority from, and incorporates by reference German Patent Application No. DE 10 2006 060 240.4.

TECHNICAL FIELD

The invention relates to an apparatus and method for receiving and/or delivering a polymer melt.

BACKGROUND

Document DE 102 33 299 A1 discloses a lifting apparatus and an associated method for receiving a polymer melt, such as a tacky polymer melt, which lies on a transport belt and for transporting and delivering the polymer melt into the press mold of a molding press. Here, the polymer melt is received by one or more elastic carrying sheets.

However, there is a need for an apparatus for improving a lifting operation of the polymer melt.

SUMMARY

Accordingly, an apparatus according to various exemplary embodiments has a lifting apparatus with at least one carrying means for receiving and/or delivering a polymer melt, in particular a tacky polymer melt.

According to one exemplary embodiment, a compensation bearing unit is provided, via which the carrying means is mounted. As a result, the properties of the carrying means can be designed simply for a carrying function. For instance, a material thickness of the carrying means can be adapted and replacement of the carrying means can also be simply achieved. As a result of an adaptation of the material thickness, a high rigidity of the carrying means can advantageously be achieved and bending of the carrying means can be avoided in an operation of receiving and transporting the polymer melt. This can result firstly in satisfactory handling of the apparatus, and secondly the production of waste products and contamination can advantageously be prevented, as a counter movement of the carrying means which is produced when the carrying means is pulled out is minimized and damage to the polymer melt which is caused as a result is precluded.

The carrying means can be configured from a material, such as plastic, ceramic or preferably metal, in the form of a carrying sheet. However, it can also be formed from any appropriate material as recognized by a person skilled in the art. Furthermore, it can advantageously be achieved that a setting-down force of the carrying means onto a transport unit, such as a transport belt, can be minimized or can be set by means of a spring force or a weight moment.

According to another exemplary embodiment, a carrying means is mounted in an articulated manner, as a result of which flexible orientation and level compensation of the carrying means can be achieved. This refinement can be realized in a structurally simple manner. Furthermore, satisfactory guidance of the carrying means can advantageously be ensured, which leads to higher reliability of the apparatus. Furthermore, the production of waste products can be minimized and high loadbearing reliability can be achieved, in particular in the case of heavy and wide polymer melts.

Furthermore, it is advantageous if the carrying means has a tapering region at one end which points in a pushing-under direction. Here, in particular, the tapering region is to be understood as converging at one end in one region, as viewed along the longitudinal section, the region having a cross section which is oriented perpendicularly with respect to the longitudinal direction and preferably has a maximum of 50%, advantageously a maximum of 30% and particularly preferably a maximum of 10% of a cross-sectional surface perpendicularly with respect to the longitudinal extent of the carrying means. The converging region is preferably beveled in the manner of a knife and has a sharp edge. However, other refinements which appear appropriate to a person skilled in the art are also possible. Satisfactory and material-protecting pushing-under properties of the carrying means below the polymer melt for raising the latter can therefore also be simply realized.

The end which points in the pushing-under direction is advantageously of rounded configuration in a direction as viewed perpendicularly with respect to the longitudinal extent. By means of this blunt refinement of that end of the carrying means which takes part in the process of pushing under and raising, careful handling of the polymer melt can be achieved and, particularly advantageously, damage to the polymer melt can be avoided.

In a further refinement of the invention, there is provision for at least one stop to be arranged which delimits at least one vertical movement of the carrying means. As a result of the attachment of the stop, limiting of the movement to a defined range can advantageously be achieved in addition to the flexible movement of the carrying means. The arrangement of two stops which delimit the vertical movement preferably in two opposite directions, such as vertically upward and downward, can be considered particularly advantageous, since the movement space can be limited particularly simply in this way. Here, a movement space is advantageous which encloses a movement angle of the carrying means, in particular in relation to a change of an orientation of the longitudinal axis of the carrying means, between two stops of a maximum of 100, particularly advantageously between a minimum of 10 and a maximum of 6°. A limiting function of the stops can be realized in a particularly simple manner if they are arranged on an element of the apparatus, on which the carrying means is also arranged. Furthermore, the limiting space between the stops can be set freely via an operating element in the form of an adjusting screw, with the result that movement angles of greater than 10° can also be realized. As a result, a freedom of movement of the carrying means can be set in a targeted manner to one or more properties, such as the size and weight of the polymer melt.

Furthermore, the apparatus may have at least one carrier means, on which at least the carrying means is arranged. As a result, a flexible design of the arrangement of the carrying means can advantageously be ensured. Furthermore, the carrying means can be connected to the carrier means via an extension which is connected between them. Here, a selection of the materials which are used can be of flexible and different design. An adaptation to the properties of the polymer melt can also be realized readily, as an exchange of components, such as the extension or the carrying means, is made possible in a rapid and simple way.

Furthermore, it can be advantageous if a bearing means is provided for rotatably mounting of the carrier means. If the bearing means is configured as a joint, this results in a functional advantage. The carrier means can be adjusted, tilted and/or rotated in a structurally simple way, as a result of which a further process position of the carrier means, such as a cleaning position or a security throw-off position, can be achieved. Here, in particular, a further process position is to be understood as an alternative position of the carrier means with respect to the position while the carrying means is pushed under the polymer melt and/or the transport of the polymer melt. Furthermore, it is possible that the joint of the bearing means can be configured in one piece with the joint of the compensation bearing unit. As a result, components, installation space, assembly expenditure and costs can be saved advantageously, and additionally the position of the carrying means can also be changed easily as a result of an unlocking unit which is arranged on the joint. An unlocking mechanism of the unlocking unit can operate in an at least partially automated manner and/or can be coupled to an actuating unit of the safety unit.

If the carrier means can be adjusted by at least an angle of 80°, it can advantageously be achieved that the further process position can be realized easily. The movement preferably has an angle of 90° and results in a perpendicular process position with respect to the pushing-under and transport position. As a result, the reaching of the cleaning position can be ensured by lowering of the carrier means by means of a vertical stroke, and a high quality standard of the products can therefore be ensured. Furthermore, discharge of the polymer melt as a result of faults can take place without problem and high security of the apparatus can be achieved as a result.

In addition, at least one stripper may be provided which can be used for positioning of the polymer mount. The stripper is advantageously arranged on a further component that extends parallel to the carrying means, and in particular parallel to the pushing-under position of the carrying means. In addition, the stripper can be moved in various ways, such as folding out, extending or rotating, in particular into a delivery region of the polymer melt. However, further movement types which appear appropriate to a person skilled in the art are also conceivable. Furthermore, the stripper can be fastened in a vertically and horizontally adjustable manner and can therefore be set to various dimensions, such as thicknesses, widths and/or lengths of the polymer melt. Here, the arrangement of two strippers can be particularly advantageous, in each case one stripper being arranged on one polymer melt side in a delivery process, as a central position of the polymer melt on a delivery point, arranged on a unit for further processing, can be realized readily as a result.

In a further embodiment, an actuating unit is provided, via which the stripper can be moved at cyclical intervals in an at least partially automated manner. The actuating unit is to be understood, in particular, as a control and/or regulating unit which has a computing and/or storage unit, via which a process program can be controlled. An information link or transmission of signals between the actuating unit and an effector unit of the stripper can be effected via a cable and/or in a contactless manner by radio, by infrared and/or ultrasound; however, further transmission types which appear appropriate to a person skilled in the art are also conceivable. Here, the effector unit is to be understood, in particular, as a unit which is activated upon a signal of the actuating unit and causes an effect and/or a reaction of an apparatus and/or of a component. The arrangement of the actuating unit can advantageously achieve a situation where independent control is made possible, by way of which the stripper can be activated at regular intervals in the process.

If the apparatus has a heat-retaining apparatus, cooling of the polymer melt and therefore an obstacle to processing can advantageously be suppressed. Usability of the polymer melt can therefore be ensured, even in the case of process delays. Furthermore, it is advantageous if the heat-retaining apparatus comprises a heat source, such as a heating element which emits heat to the polymer melt, with the result that a constant temperature can advantageously be achieved. This heating element can be an electric heating element or preferably an infrared heating unit. A sensor unit, such as a temperature sensor, can be provided for control of the temperature.

In addition, at least one safety unit may be provided which initiates a safety measure as a function of at least one parameter in an at least partially automated manner. The safety unit can be controlled by an actuating unit. The actuating unit can be a manual actuating unit, such as a manually actuable switch, a sensor or another unit which acts in an appropriate manner according to a person skilled in the art. The signal transmission can take place in an analogous manner to the actuating unit of the stripper. Safety regulation can therefore be achieved simply via the safety unit as a function of the process and its parameters, such as erroneous positioning of the polymer melt, the temperature and/or the time. It can be particularly advantageous if the parameter which determines the safety measure is formed by the time parameter. This results in simple process control which can be realized by an inexpensive controller, such as by way of a time switch.

In a further embodiment, the safety unit may comprise at least one transport apparatus for moving an apparatus means. In the case of a faulty process sequence, the safety unit can intervene in the arrangement of the components of the process, by the transport apparatus being activated. Here, the apparatus means are to be understood, in particular, as both the heat-retaining apparatus and the carrier means. However, further means which appear appropriate to a person skilled in the art, such as an additional cover, can also be considered. As a result of the movement of the apparatus means, firstly turning away or positional adjustment of the heat-retaining apparatus can be brought about, and/or secondly discharge of the polymer melt can be effected.

The safety unit may have a quenching blanket. As a result, overheating of the polymer melt can preferably be avoided. The quenching blanket can be pulled in between the polymer melt and a heat source of the heat-retaining apparatus to achieve a simple and inexpensive construction. Switching on and off of the heat source, which consumes energy, is dispensed with, a heat field which is caused by rotation of the heat-retaining apparatus and could damage or endanger surrounding constituent parts of the apparatuses and/or an operator is avoided, loss of the product and, as a result, high wastage production can be minimized, and, in particular, a low space requirement can be realized both during operation and during storage. Furthermore, further installation space can be saved, as a guiding means of the quenching blanket during folding and unfolding or rolling up and unrolling of the thin quenching blanket is of spacesaving construction.

Furthermore, an actuating unit may be provided, via which the quenching blanket is pulled in an at least partially automated manner. As a result of partially automated control, the security measure of pulling in of the quenching blanket can be integrated simply into the process sequence, in particular if the actuating unit is configured as a time switch and the activation of the quenching blanket mechanism is dependent on a time parameter. As a result, an expensive sensor, such as a temperature sensor, can be dispensed with. The information link or the transmission of the signals between the actuating unit and an effector unit of the quenching blanket can be effected via a cable or in a contactless manner by radio, by infrared or ultrasound. Further transmission types which appear appropriate to a person skilled in the art are also conceivable. Furthermore, the actuating unit can be configured particularly inexpensively in one piece with the actuating unit of the safety unit. However, even in the case of failure of the entire operating controller, the quenching blanket can be pulled in automatically or necessarily by prestressed energy. For a situation of this type, a quenching gas, such as $CO_2$, or other means which prevent possible ignition could also be used.

According to another embodiment, a cleaning process of at least one cleaning means of a cleaning apparatus is advantageously provided for cleaning at least the carrying means. As a result, contamination of the following products can be appropriately avoided, and the service life of the apparatus and therefore long-time use can advantageously be ensured. Furthermore, contamination can be prevented as a result during a product change to products having a different material composition. The cleaning means can be a brush, a high-pressure jet, a contact doctor and/or another cleaning means which appears appropriate to a person skilled in the art. Furthermore, it is conceivable that a further cleaning apparatus can be provided, by which another constituent part of the apparatus, for example the transport belt, can be cleaned.

In addition, a cooling zone may be provided, into which at least the carrying means can be dipped and/or placed. The cooling zone is to be understood, in particular, as a region which is cooled below an operating temperature of the apparatus, which takes place, for example, via a stream of cold air. As a result, impairment of the polymer melt as a result of the transmission of heat from the carrying means to the polymer melt can be avoided. Furthermore, overheating and/or deterioration of the sliding properties of the carrying means by the heat source of the heat-retaining apparatus can advantageously be avoided as a result of the cooling of the carrying means. Disruptions and/or damage of constituent parts of the cleaning apparatus as a result of an excessively hot surface of the carrying means in the cleaning process can also be suppressed. Furthermore, optimum conditions for subsequent coating can be provided. This coating is advantageously applied by a coating unit which coats at least the carrying means with at least one release agent. The coating can take place by means of spraying, dipping, brushing and/or a further coating method which appears appropriate to a person skilled in the art. The release agent can be a release fluid and/or a release powder, such as chalk powder and/or preferably talcum powder. However, other release agents which appear appropriate to a person skilled in the art are also conceivable. Simple and complete release of the polymer melt from the carrying means can advantageously be ensured by the coating.

In a further embodiment, a method is proposed which serves to receive and/or deliver a polymer melt, in particular a tacky polymer melt, by means of a carrying means, and in which the carrying means is moved in at least one operating mode via a compensation bearing element. Here, the operating mode represents a process setting, in which the carrying means is arranged in a process position, in particular the pushing-under position. It can advantageously be achieved that the properties of the carrying means can be designed simply for a carrying function. The material thickness of the carrying means can be adapted, and a high rigidity of the carrying means can advantageously result. Bending of the carrying means in the process of receiving and transporting the polymer melt can be largely avoided. This results in satisfactory handling of the apparatus, and production of waste products and contamination can advantageously be prevented, and particularly wide and heavy polymer melts can also be handled.

If an actuating unit is provided, via which the safety unit is activated as a function of at least one parameter in an at least partially automated manner, it can advantageously be achieved that security measures can be built into the process and controlled. The actuating unit can be a manual actuating unit, such as a manually actuable switch, a sensor and/or another unit which functions in an appropriate way according to a person skilled in the art. Furthermore, safety regulation can be achieved simply via the actuating unit as a function of the process and its parameters, such as erroneous positioning of the polymer melt, temperature and/or time. The parameter which determines the security measure can advantageously be formed by a time parameter and determined and/or effected by a time switch.

In addition, in a further operating mode, the carrying means is adjusted in an at least partially automated manner by at least an angle of 80° with respect to the pushing-under position. Here, the further operating mode is to represent a process setting, in which the carrying means can be arranged in a further process position with respect to the pushing-under position. An angular position of 90° with respect to the pushing-under position and the resulting perpendicular position of the carrying means with respect to its position in the pushing-under position can be considered advantageous, as a cleaning position can be ensured as a result in a structurally simple manner by lowering of the carrier means by means of a vertical stroke, and a high quality standard of the products can therefore be ensured. Furthermore, discharge of the polymer melt as a result of faults can take place without problems, and high reliability of the apparatus can be achieved as a result. The adjustment of the carrying means advantageously takes place in a structurally simple manner by means of a joint which can be configured in one piece with the joint of the compensation bearing unit, which saves a particular amount of components, installation space, assembly expenditure and costs. Furthermore, the actuating unit can be coupled to an actuating unit of the safety device.

BRIEF DESCRIPTION OF THE DRAWINGS

Further advantages result from the following description of the drawings. The drawings, the description and the claims contain numerous features in combination. A person skilled in the art will expediently also consider the features individually and combine them to form appropriate further combinations.

In the drawings.

DETAILED DESCRIPTION

Figure 1:
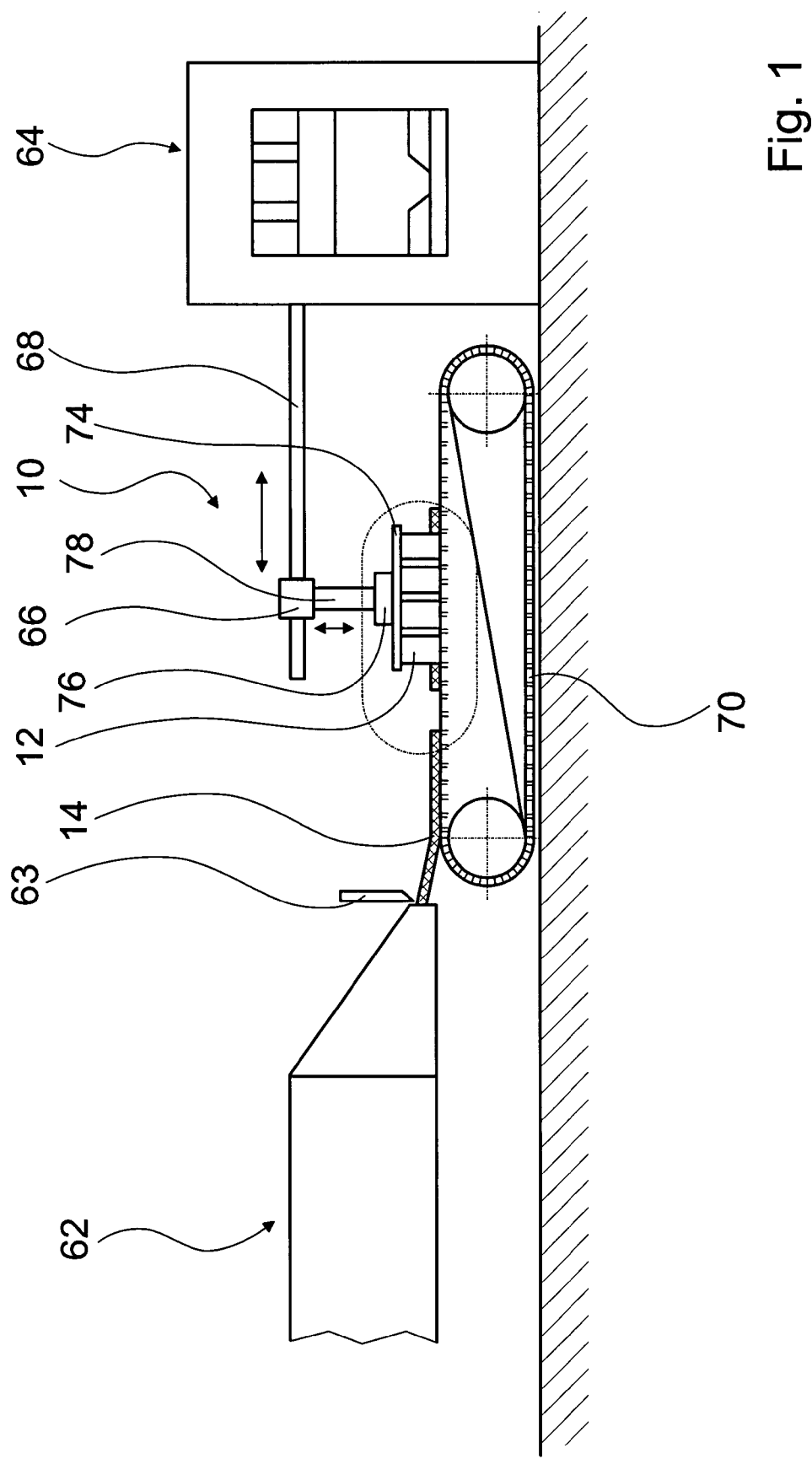
FIG. 1 shows an apparatus for carrying out a method, in a side view.

FIG. 1 shows an apparatus for carrying out a method for receiving and/or delivering a polymer melt 14. A lifting apparatus 10 is arranged between an extruder 62 or another extrusion producing unit and a molding press 64. The lifting apparatus 10 is configured for transport of the polymer melt 14 via a moving drive 66 on the moving rod 68. The polymer melt 14 leaves the extruder 62 as an endless extrusion and, separated by a cutting unit 63 into a polymer melt piece, is delivered onto a transport belt, in particular onto an endless transport belt 70. From the delivery point of the transport belt, it is transported by the endless transport belt 70 into the region of the lifting apparatus 10.

Figure 2:
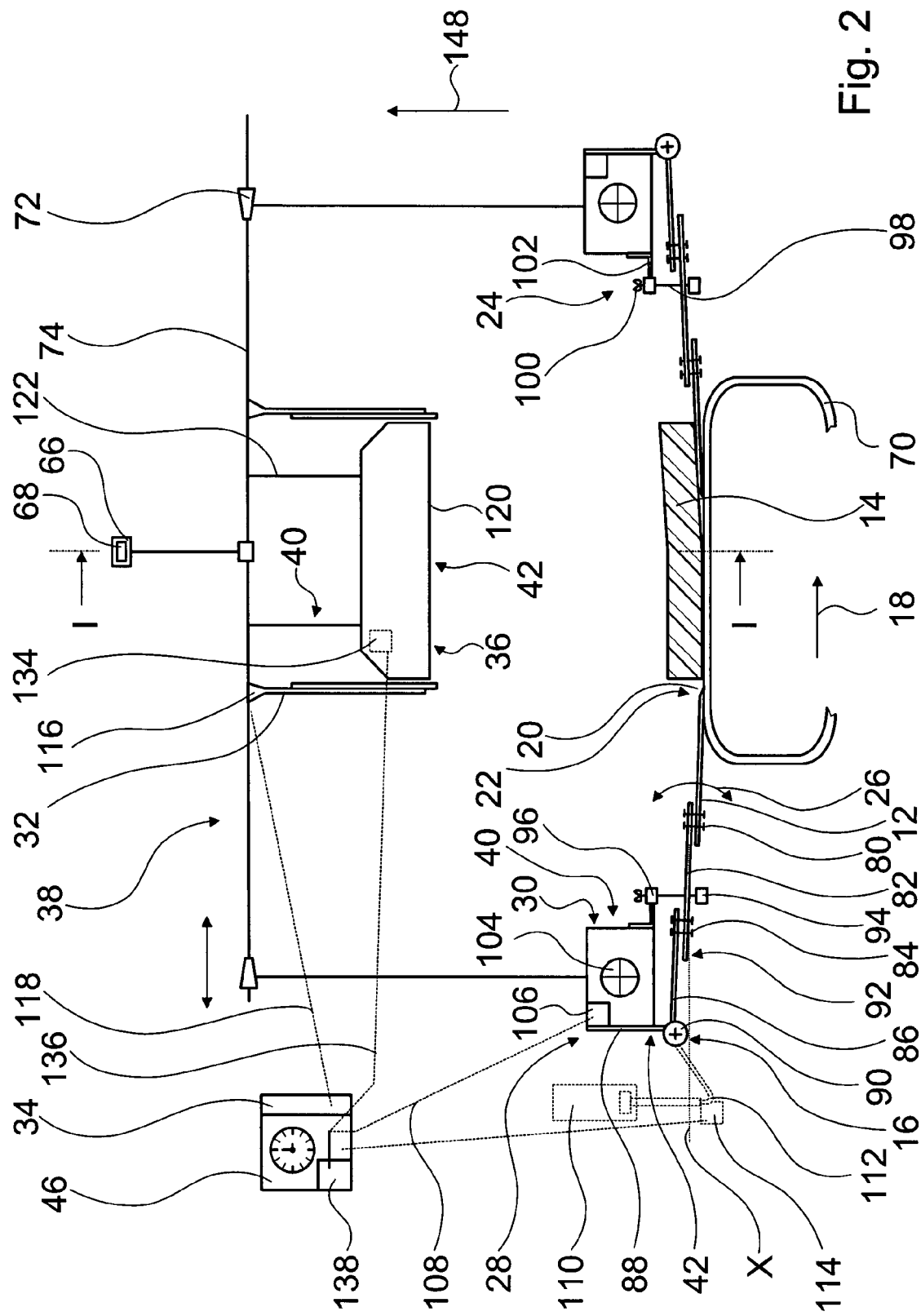
FIG. 2 shows the apparatus in a front view in two operating modes, on the left before a receiving process and on the right during a transport process.

As shown in FIGS. 1 and 2, in the lifting apparatus 10, the polymer melt 14 is received by one or more carrying means 12 which are mounted via compensation bearing units 16, during operation of the lifting apparatus 10. The carrying means 12 are arranged on two longitudinal sides of the polymer melt 14 which lie opposite one another and are carrying plates made from stainless steel. Receiving takes place by pushing under a rounded edge 20 at a tapering region 22 of the carrying means 12 in a pushing-under direction 18 on two longitudinal sides of the polymer melt 14 which lie opposite one another (see FIG. 2, left-hand side). The carrying means 12, which lie opposite one another, move toward one another in the plane of the main extent surface of the polymer melt 14.

The carrying means 12 are arranged such that they can be displaced via transverse moving drives 72 on a transverse moving rod 74 perpendicularly with respect to the longitudinal center axis I-I. The transverse moving rod 74 is in turn guided via a lifting drive 76 on a lifting spindle 78 for a movement in a vertical up and down movement. A plurality of elements are arranged between the transverse moving drive 72 and the carrying means 12. Here, the carrying means 12 is fastened to an extension 82 made from stainless steel via at least one force-transmitting, material-to-material and/or form-fitting connection, such as a clamping connection 80. The extension 82 is in turn attached to a carrier means 28 via at least one force-transmitting, material-to-material and/or form-fitting connection, such as a clamping connection 84. The carrier means 28 has a first limb 86 and a second limb 88 which are arranged approximately perpendicularly with respect to one another, for example in an L shape, and are connected via their compensation bearing unit 16 in the form of a joint 90. The clamping connection 84 is arranged on the first limb 86, and a bearing means 30 which produces a connection to the transverse moving drive 72 is situated on the second limb 88. The first limb 86, the extension 82 and the carrying means 12 form a carrying unit 92. It would also be possible for the carrying means 12 and/or the carrying unit 92 to be configured in one piece with the carrier means 28. A vertical movement 26, in particular a vertical rotational movement of the carrying unit 92, is possible about an axis of the joint 90 via the compensation bearing unit 16 or the joint 90, with the result that the carrying unit 92 can be moved in a plane X.

The vertical movement 26 encloses an angle here of from a minimum of 2° to a maximum of 6° and is delimited by a stop 24. This stop 24 has two delimiting blocks 94, 96 which are connected via a threaded rod 98 and which can be adjusted with respect to one another by means of an adjusting screw 100. The delimiting block 96 is fastened adjustably to the bearing means 30 via a fastening rod 102. However, the adjustable fastening of the threaded rod 98 to the bearing means 30 would also be conceivable.

The bearing means 30 is configured as a joint 104 and is coupled to an effector unit 106. This effector unit 106 receives signals from an actuating unit 46 via a radio link 108. The actuating unit 46 comprises a time switch which can bring about adjustment of the carrier means 28 by means of the joint 104 after a process time has elapsed, automatically and at cyclical intervals. As an alternative, as is indicated by dashed lines in FIG. 2, an unlocking unit 110 can be arranged on the joint 90 via a contact pin 112, instead of the joint 104 of the bearing means 30, via which the joint 90 and the carrying unit 92 can be unlocked. An effector unit 114 which is arranged on the unlocking unit 110 can be controlled automatically by the actuating unit 46 via a radio link.

Figure 3:
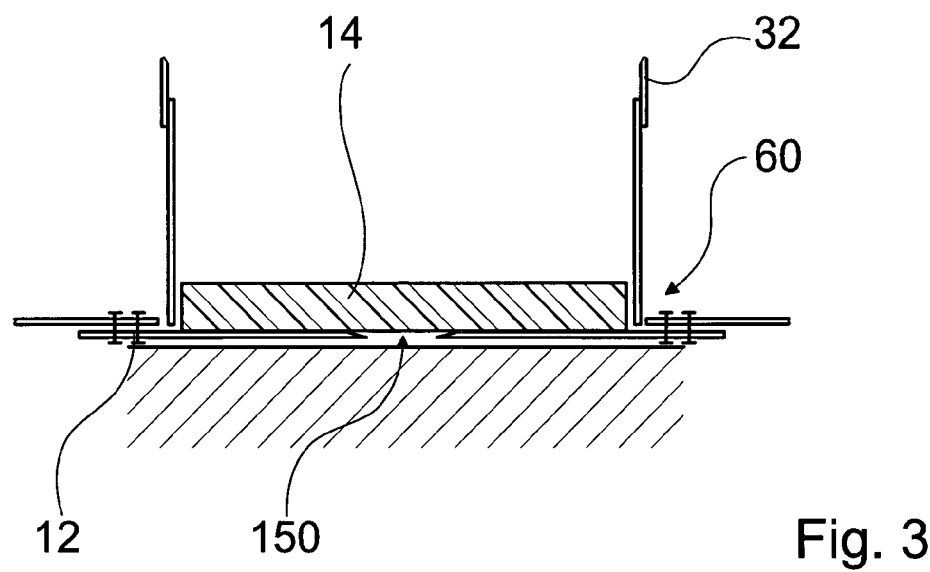
FIG. 3 shows the apparatus in the operating mode of a delivery process.

As shown in FIGS. 2 and 3, strippers 32 are arranged on the transverse moving rod 74, which are extended if the polymer melt 14 is delivered, for example, in the molding press 64, with the result that they are arranged on two sides of the polymer melt 14 and reach exact positioning of the polymer melt 14 during a delivery process at a delivery point 150. The strippers 32 are coupled to an effector unit 116 which enters into a radio link 118 with an actuating unit 34 for signal transmission. The actuating unit 34 is coupled to the actuating unit 46 and the time switch of the actuating unit 46, and the strippers 32 can be actuated in an automated manner and at cyclical intervals.

Figure 4:
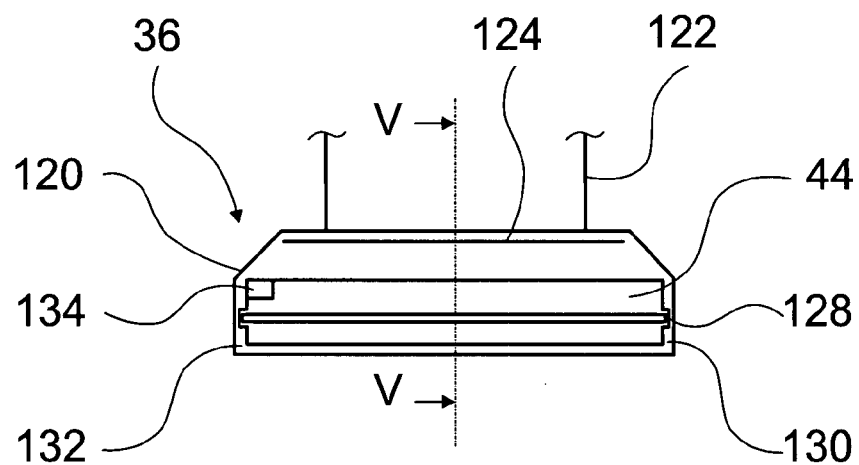
FIG. 4 shows a longitudinal section through a heat-retaining apparatus from FIG. 2.

Furthermore, as shown in FIG. 4, a heat-retaining apparatus 36 in the form of a heat-retaining hood 120 is mounted on the transverse moving rod 74 via bearing elements 122. The heat-retaining hood 120 can be heated by means of an infrared heat unit 124.

Figure 5:
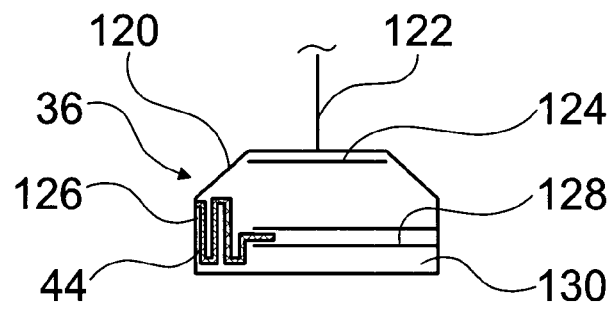
FIG. 5 shows a cross section V-V through the heat-retaining apparatus of FIG. 4.

As shown in FIGS. 4 and 5, the quenching blanket 44 is arranged on an inner side 126 of a vertically oriented side wall of the heat-retaining hood 120. The quenching blanket 44 is mounted in such a way that it can be unfolded or pulled out via guide webs 128, which extend over to further inner sides 130, 132 of the heat-retaining hood 120, which in turn are arranged perpendicularly with respect to the inner side 126 and extend parallel to one another. An effector unit 134 is arranged on the quenching blanket 44 and is in contact via a radio link 136 with the actuating unit 46 and therefore with the time switch of the actuating unit 46. As a consequence of the signal of the actuating unit 46, the effector unit 134 automatically triggers the unfolding and folding of the quenching blanket 44.

Referring again to FIG. 2, a further actuating unit 138 controls a safety unit 38 which is composed of a transport apparatus 40 in the form of the bearing means 30 or the bearing element 122 and an apparatus means 42 which is moved by the transport apparatus 40. The apparatus means 42 is in turn composed of the carrier means 28 or the heat-retaining apparatus 36. The actuating unit 138 is situated on the actuating unit 46 and is coupled to the latter.

Figure 6:
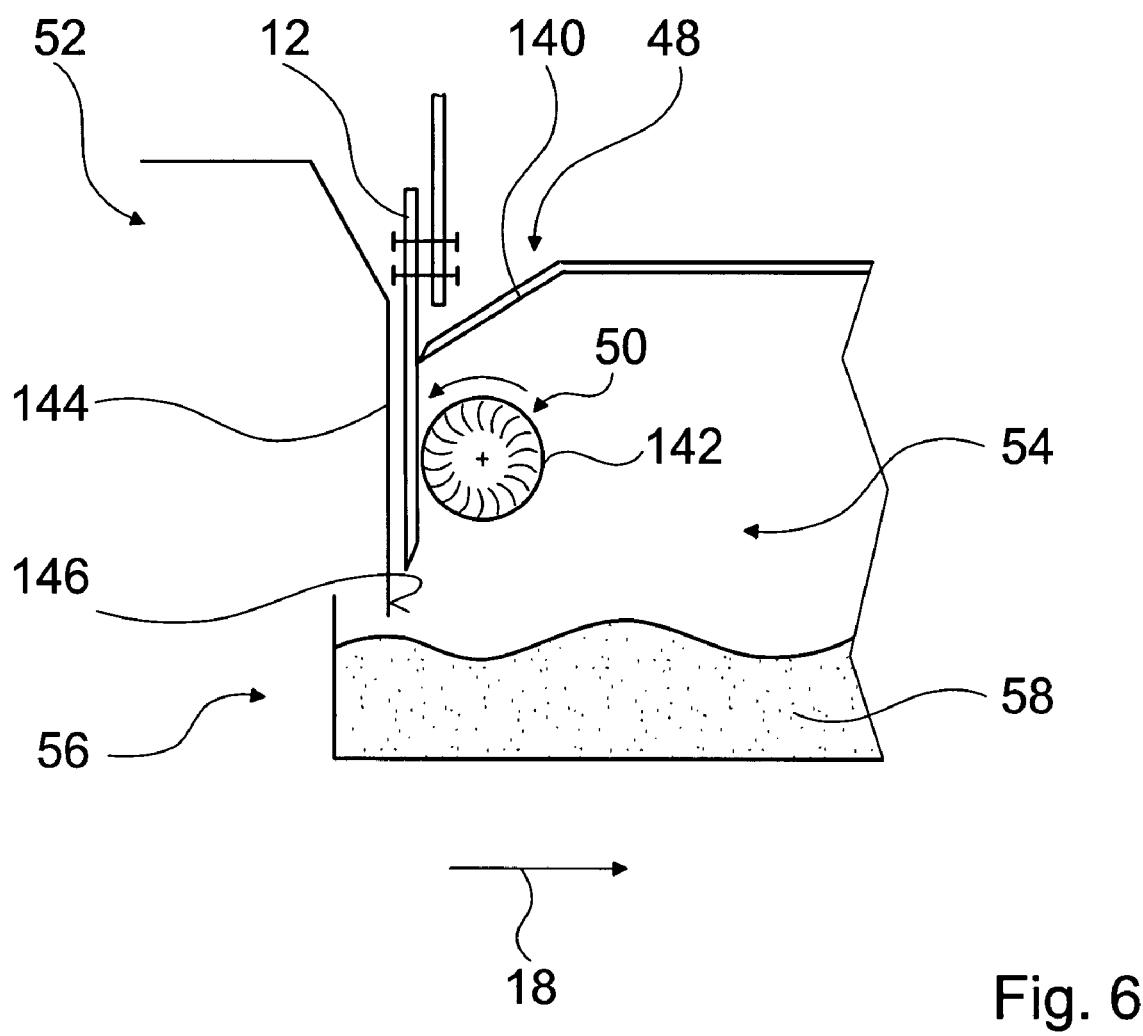
FIG. 6 shows the apparatus during a cleaning process.

FIG. 6 shows a cleaning apparatus 52. In order to reach a cleaning position, rotation of the bearing means 30 is completed in the joint 104 by 90°, and a perpendicular position of the carrying unit 92 with respect to the pushing-under direction 18 is reached. In this position, the carrying means 12 can be moved in the vertical direction by the lifting drive 76 (see FIG. 1) and can be brought via a cooling zone 54 into the cleaning apparatus 52. The carrying means 12 is freed of polymer melt residues by being guided past the cleaning means 48 in the form of a horizontally displaceable contact doctor 140. Further cleaning subsequently takes place by way of a further cleaning means 50 which is formed by a brush 142. Here, a contact means 144 forms a contact face 146 for the carrying means 12 during the cleaning process. The carrying means 12 is subsequently coated with a release agent 58, namely talcum powder, by being dipped into a coating unit 56.

Referring again to FIG. 2, in operation, two carrying means 12 which are arranged on opposite longitudinal sides of the polymer melt 14 are pushed between the polymer melt 14, which lies on the endless transport belt 70, and the surface of the endless transport belt 70 by way of their rounded ends 20 which are arranged in the tapering region 22. The carrying means 12 are loaded with the weight of the polymer melt 14 by the vertical movement of the lifting drive 76, and they are deflected via the joint 90 of the compensation bearing unit 16 counter to the movement direction 148, depending on the weight of the polymer melt 14, in an angle of from 1° to 3°. The deflection movement is stopped by the delimiting block 94 of the stop 24, and the carrying means 12 is held by the delimiting block 94 in a pushing-under position 60 which also corresponds to the transport position (see FIG. 2, right-hand side). During the transport process from the endless transport belt 70 to the molding press 64, the polymer melt 14 is covered by the heat-retaining hood 120 and is heated if required by means of the infrared heat unit 124. The infrared heat unit 124 is controlled via a sensor unit (not shown in greater detail).

As shown in FIGS. 1-3, at the delivery point 150 of the molding press 64, the carrying means 12 maintain a small spacing with their underside and the strippers 32, activated by signals of the radio link 118, are extended between the actuating unit 34 and the effector unit 116 counter to the movement direction 148 and are arranged on the longitudinal sides of the polymer melt 14. The strippers 32 can also already be extended during the movement to the delivery point 150. By activation of the transverse moving drives 72, the carrying means 12 are pulled out from under the polymer melt 14 counter to the pushing-under direction 18. Here, the strippers 32 prevent erroneous positioning of the polymer melt 14 and hold it in a centered manner at the desired delivery point 150.

If a control disruption (not described in greater detail here), for example of the lifting apparatus 10, or a timeout occur during the process sequence, the effector unit 134 is activated via the actuating unit 138 of the safety unit 38 and, if required, via the time switch of the actuating unit 46 and via the radio link 108, and the polymer melt 14 is ejected by displacement of the transport apparatus 40 or the carrier means 28 and therefore of the carrying unit 92 by 90°. If a sensor (not described in detail here) determines that the lifting apparatus 10 is situated in an ejecting position which is not suitable for ejection of the polymer melt 14, such as above the delivery point 150, the infrared heat unit 124 is switched off via a signal chain which is not explained precisely here. Furthermore, the actuating unit 46 which is activated by the sensor enables, via the radio link 136 and the effector unit 134, the pulling of the quenching blanket 44 in between the polymer melt 14 and the infrared heat unit 124, in order that possible ignition of the polymer melt 14 can be prevented. If the entire logic or control means fails, the quenching blanket 44 is pulled automatically or necessarily between the polymer melt 14 and the infrared heat unit 124 by prestressed energy. For a situation of this type, the quenching gas, such as $CO_2$, or other means which prevent possible ignition could also be used.

After the polymer melt 14 is delivered at the delivery point 150 of the molding press 64 or the polymer melt 14 has been ejected for safety reasons due to a timeout and/or a control disruption, the carrying means 12 is subjected to a cleaning process. For this purpose, the lifting apparatus 10 moves into the region of the cleaning apparatus 52 with the aid of the transverse moving drive 72 and the lifting drive 76. The carrying means 12 is cleaned there as in the description of FIG. 6.

After cleaning, the carrying unit 92 is moved into the pushing-under position 60 by the bearing means 30, and the next polymer melt can be received (see FIG. 1, left-hand side).

The invention is described herein in detail with particular reference to presently preferred exemplary embodiments. However, it will be understood that variations and modifications can be effected within the scope and spirit of the invention.

What is claimed is:

1. An apparatus comprising:
a lifting apparatus having at least one carrying means for receiving and/or delivering a polymer melt and
a compensation bearing unit, via which the carrying means is mounted, wherein
the carrying means has a tapering region at one end which points in a pushing-under direction, and wherein
the end which points in the pushing-under direction is of rounded configuration in a direction as viewed perpendicularly with respect to the longitudinal extent.

2. The apparatus according to claim 1, wherein
the carrying means is mounted in an articulated manner.

3. The apparatus according to claim 1, further comprising
at least one cleaning means of a cleaning apparatus, the cleaning means cleaning at least the carrying means.

4. The apparatus according to claim 1, further comprising
a coating unit which coats at least the carrying means with at least one release agent.

5. An apparatus comprising:
a lifting apparatus having at least one carrying means for receiving and/or delivering a polymer melt;
a compensation bearing unit, via which the carrying means is mounted; and
at least one stop which delimits at least one vertical movement of the carrying means.

6. The apparatus according to claim 5, wherein
the carrying means is mounted in an articulated manner.

7. The apparatus according to claim 5, further comprising
at least one cleaning means of a cleaning apparatus, the cleaning means cleaning at least the carrying means.

8. The apparatus according to claim 5, further comprising
a coating unit which coats at least the carrying means with at least one release agent.

9. An apparatus comprising:
a lifting apparatus having at least one carrying means for receiving and/or delivering a polymer melt;
a compensation bearing unit, via which the carrying means is mounted;
at least one carrier means, on which at least the carrying means is arranged; and
a bearing means which is provided for rotatable mounting of the carrier means.

10. The apparatus according to claim 9, wherein
the carrying means is mounted in an articulated manner.

11. The apparatus according to claim 9, further comprising
at least one cleaning means of a cleaning apparatus, the cleaning means cleaning at least the carrying means.

12. The apparatus according to claim 9, further comprising
a coating unit which coats at least the carrying means with at least one release agent.

13. An apparatus comprising:
a lifting apparatus having at least one carrying means for receiving and/or delivering a polymer melt;
a compensation bearing unit, via which the carrying means is mounted; and
at least one carrier means, on which at least the carrying means is arranged, wherein
the carrier means can be adjusted about at least an angle of 80°.

14. The apparatus according to claim 13, wherein
the carrying means is mounted in an articulated manner.

15. The apparatus according to claim 13, further comprising
at least one cleaning means of a cleaning apparatus, the cleaning means cleaning at least the carrying means.

16. The apparatus according to claim 13, further comprising
    a coating unit which coats at least the carrying means with at least one release agent.

17. An apparatus comprising:
    a lifting apparatus having at least one carrying means for receiving and/or delivering a polymer melt;
    a compensation bearing unit, via which the carrying means is mounted; and
    at least one stripper which can be used for positioning of the polymer melt.

18. The apparatus according to claim 17, wherein the carrying means is mounted in an articulated manner.

19. The apparatus according to claim 17, further comprising
    at least one cleaning means of a cleaning apparatus, the cleaning means cleaning at least the carrying means.

20. The apparatus according to claim 17, further comprising
    a coating unit which coats at least the carrying means with at least one release agent.

21. An apparatus comprising:
    a lifting apparatus having at least one carrying means for receiving and/or delivering a polymer melt;
    a compensation bearing unit, via which the carrying means is mounted; and
    a heat-retaining apparatus.

22. The apparatus according to claim 21, wherein the carrying means is mounted in an articulated manner.

23. The apparatus according to claim 21, further comprising at least one cleaning means of a cleaning apparatus, the cleaning means cleaning at least the carrying means.

24. The apparatus according to claim 21, further comprising
    a coating unit which coats at least the carrying means with at least one release agent.

25. An apparatus comprising:
    a lifting apparatus having at least one carrying means for receiving and/or delivering a polymer melt;
    a compensation bearing unit, via which the carrying means is mounted; and
    at least one safety unit which is provided for initiating a safety measure as a function of at least one parameter in an at least partially automated manner.

26. The apparatus according to claim 25, wherein the carrying means is mounted in an articulated manner.

27. The apparatus according to claim 25, further comprising
    at least one cleaning means of a cleaning apparatus, the cleaning means cleaning at least the carrying means.

28. The apparatus according to claim 25, further comprising
    a coating unit which coats at least the carrying means with at least one release agent.

29. An apparatus comprising:
    a lifting apparatus having at least one carrying means for receiving and/or delivering a polymer melt;
    a compensation bearing unit, via which the carrying means is mounted; and
    a cooling zone, into which at least the carrying means can be dipped and/or placed.

30. The apparatus according to claim 29, wherein the carrying means is mounted in an articulated manner.

31. The apparatus according to claim 29, further comprising
    at least one cleaning means of a cleaning apparatus, the cleaning means cleaning at least the carrying means.

32. The apparatus according to claim 29, further comprising
    a coating unit which coats at least the carrying means with at least one release agent.

33. A method for receiving and/or delivering a polymer melt by an apparatus having a lifting apparatus having at least one carrying means for receiving and/or delivering a polymer melt and including a compensation bearing unit, via which the carrying means is mounted, wherein
    the carrying means is moved in at least one operating mode via the compensation bearing unit; and
    the apparatus having a lifting apparatus further comprises an actuating unit, via which a safety unit is activated as a function of at least one parameter in an at least partially automated manner.

34. A method for receiving and/or delivering a polymer melt by an apparatus having a lifting apparatus having at least one carrying means for receiving and/or delivering a polymer melt and including a compensation bearing unit, via which the carrying means is mounted, wherein
    the carrying means is moved in at least one operating mode via the compensation bearing unit; and
    in a further operating mode, the carrying means is adjusted in an at least partially automated manner by at least an angle of 80° with respect to a pushing-under position.

35. The apparatus according to claim 17, further comprising an actuating unit, via which the stripper can be moved at cyclical intervals in an at least partially automated manner.

36. The apparatus according to claim 25, wherein the parameter is formed by a time parameter.

37. The apparatus according to claim 25, wherein the safety unit comprises at least one transport apparatus for moving an apparatus means.

38. The apparatus according to claim 25, wherein the safety unit has a quenching blanket.

39. The apparatus according to claim 38, further comprising
    an actuating unit, via which the quenching blanket is pulled in an at least partially automated manner.

\* \* \* \* \*